Patented June 29, 1943

2,323,075

UNITED STATES PATENT OFFICE

2,323,075

PROCESS OF PREPARING THIURONIUM SALTS

Ludwig Orthner and Gerhard Balle, Frankfort-on-the-Main, Georg Dittus, Ludwigshafen-on-the-Rhine, and Hermann Wagner, Frankfort-on-the-Main, Germany; vested in the Alien Property Custodian No Drawing. Application January 31, 1939, Serial No. 253,776. In Germany February 1, 1938

4 Claims. (Cl. 260—399)

The present invention relates to thiuronium salts and to a process of preparing them.

We have found that valuable thiuronium salts are obtainable by reacting a carboxylic acid amide, carboxylic acid nitrile, or urethane containing at least one hydrocarbon radical having more than 10 carbon atoms, which radical may contain at least one substituent and/or be interrupted by at least one hetero-atom or heteroatom group and which may contain at least one group capable of being condensed with formaldehyde, with thiourea or an N-aliphatic or N-aryl or N-aralphatic thiourea, formaldehyde and an acid in the presence of a solvent or diluent. Instead of thiourea and an acid, there may also be used a salt of thiourea. Instead of the compound capable of being condensed with formaldehyde, the methylol compound thereof may be caused to react with thiourea and an acid.

These methods of preparing thiuronium salts may be demonstrated by the following equation:

R.CONH₂+HCl+CH₂O+NH₂—C—NH₂ ⟶
$$\phantom{xx}\|\phantom{xx}$$
$$\phantom{xx}S\phantom{xx}$$

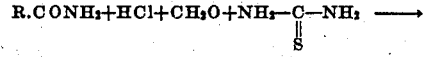

In the event that a thiourea salt is used instead of thiourea and an acid the equation is as follows:

R.CONH₂+CH₂O+NH₂—C—NH₂.HCl ⟶
$$\phantom{xx}\|\phantom{xx}$$
$$\phantom{xx}S\phantom{xx}$$

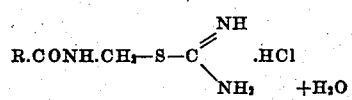

Furthermore if the methylol compound of the acid amide is used instead of the mixture of the acid amide and formaldehyde, the equation is as follows:

R.CO.NH.CH₂OH+NH₂—C—NH₂.HCl ⟶
$$\phantom{xx}\|\phantom{xx}$$
$$\phantom{xx}S\phantom{xx}$$

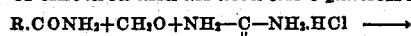

Compounds being capable of reacting with formaldehyde and suitable for use in the invention are, for instance, N-n-dodecylacetamide, laurylmethylamide, stearylamide, isooctylphenoxyacetic acid amide, amide of the hydroxystearic acid from hardened castor oil, N-octadecyl-urethane, O-octadecylurethane, stearic acid nitrile.

By the process of the invention, a carboxylic acid amide, for instance, is dissolved in an organic solvent or dispersed in water, a solid form of or aqueous formaldehyde and thiourea are added and hydrogen halide is led into the mixture, the temperature being kept high, for instance, about 60° C. to 70° C. The thiuronium salt is formed after a short time; after removal of the solvent the salt is soluble or capable of being dispersed in water. Instead of thiourea and an acid, a salt of thiourea may be used.

A modification of this process consists in starting from a methylol compound, such as the methylol compound of stearic acid amide, of O-octadecylurethane, and causing this compound to react with thiourea and an acid or with a salt which thiourea forms with an acid. In this case also the reaction may occur in the presence of water or of an organic solvent or diluent. The temperature used for the above reactions, may vary within wide limits. The reaction can occur at ordinary temperature, while in some cases it is necessary to heat the reaction mixture. Temperatures of about 80° C. to 120° C. may be considered as the upper limit. Insofar as solvents or diluents are applied, they may be removed by distillation, if desired, under reduced pressure; or when, the reaction being complete, the final products separate in a solid form on cooling, they may be isolated by filtering with suction and drying.

The products obtainable by the invention are in general solid or semi-solid fat-like masses which are either soluble in water or capable of being emulsified or dispersed in water. They may be used as treating agents for materials of every kind, such as, for instance, textiles.

The following examples serve to illustrate the invention, but they are not intended to limit it thereto; the parts are by weight:

(1) 4 parts of lauric acid amide, 1.2 parts of para-formaldehyde, 2.4 parts of thiourea hydrochloride and 20 parts of glacial acetic acid are heated together at 80° C. to 90° C. until a test portion dissolves in water to a clear solution. After the reaction, the glacial acetic acid is, at 50° C., removed under reduced pressure. The residue is a white solid, the aqueous solutions of which have a foaming action. The product corresponds to the formula:

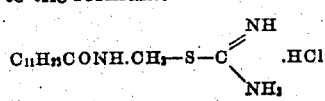

(2) 30 parts of stearic acid methylolamide, 13 parts of thiourea hydrochloride and 60 parts of methyl alcohol are heated together at 60° C. As soon as a clear solution is obtained, it is further heated until a test portion dissolves to a clear solution when poured into warm water. The whole is then allowed to cool and the product which has separated is filtered with suction. When dry, it is a white powder soluble in warm water. The product corresponds to the formula:

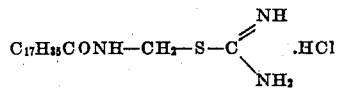

The same product is obtained when 8 parts of thiourea are dissolved in 80 parts of water containing 4 parts of hydrochloric acid of 100 per cent. strength and at 40° C. to 45° C. 31 parts of stearic acid methylol amide are introduced and the whole is stirred for about 2 hours at this temperature. The reaction product is then heated for half an hour at 55° C. to 58° C. and rapidly cooled down. After filtration with suction the crystallized product is dried under reduced pressure.

(3) 30 parts of stearic acid methylolamide are mixed with 8 parts of thiourea and 60 parts of methanol. At 60° C. hydrogen chloride is led into this mixture, which forms a thick magma; a clear solution is thereby produced. The temperature is kept constantly at 60° C. As soon as 5 parts of hydrogen chloride have been led in, the reaction is terminated. The final product is obtained by distilling the methanol under reduced pressure and is the same as that produced in Example 2.

(4) A mixture consisting of 150 parts of glacial acetic acid, 31 parts of O-octadecylurethane, 20 parts of thiourea hydrochloride and 6 parts of paraformaldehyde is heated for about 3 hours at 80° C. to 90° C. After cooling, the product obtained is filtered with suction. It dissolves easily in methanol and water and decomposes on heating as well as on addition of Na₂CO₃. The product corresponds to the formula:

$C_{18}H_{37}.O.CO.NH.CH_2.S.C\begin{smallmatrix}NH\\ \\NH_2\end{smallmatrix}.HCL$ (5) A mixture of 20 parts of thiourea hydrochloride, 160 parts of glacial acetic acid, 26.5 parts of stearic acid nitrile and 6 parts of paraformaldehyde is heated at 70° C. for half an hour and then filtered with suction after cooling. There is obtained a solid white powder which is soluble in methanol and water. On addition of sodium carbonate the product decomposes. The product most probably corresponds to the formula:

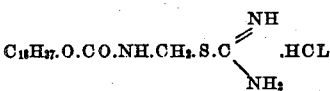

By using instead of thiourea the equivalent amount of N-benzyl-N'-ethyl-thiourea an isothiuronium salt is obtained which is very similar to the unsubstituted isothiourea-derivative, but has a lower solubility and is less stable in aqueous solution.

(6) 35 parts of the amide of para-isotetradecylphenoxy acetic acid (boiling point: 280° C. to 240° C. under a pressure of 3 millimeters) obtained by condensation of para-isotetradecylphenol in an alkaline medium with chloracetic acid are transformed into the methylol compound with aqueous formaldehyde while using potassium carbonate as a catalyst. The product obtained is washed with water and dried. The product thus obtained is heated at 60° C. to 65° C. with 12 parts of thiourea and about 4 parts of hydrochloric acid in about 100 parts of methanol until a test portion dissolves in water. After cooling the reaction product is filtered with suction. A soft mass is obtained which forms a turbid solution in methanol and water. The aqueous solution foams strongly. The product corresponds to the formula:

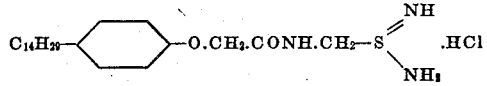

(7) 29 parts of the amide of para-n-dodecylbenzoic acid are introduced together with 4 parts of para-formaldehyde and 20 parts of thiourea hydrochloride into about 100 parts of glacial acetic acid and the whole is heated at 65° C. to 70° C. until a test portion dissolves in water. The solvent is then removed under reduced pressure and the product is dried over alkali in a desiccator. A soft mass is obtained the behavior and solubility of which resemble those of the product obtained as described in Example 2 from stearic acid amide. The product corresponds to the formula:

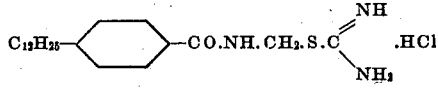

The para-n-dodecylbenzoic acid may be made by the process described in U. S. application Serial No. 212,124, filed June 6, 1938, in the name of Gerhard Balle, Hermann Wagner and Eberhard Nold, now U. S. P. 2,195,198.

(8) 20 parts of lauric acid amide, 4 parts of para-formaldehyde, 20 parts of N'N-triethylthiourea and about 4 parts of hydrochloric acid are introduced into about 100 parts of glacial acetic acid and the mixture is stirred for some time at 65° C. to 70° C. until a test portion dissolves in water. After distilling the solvent under reduced pressure there is obtained a powder which is soluble in methanol and in water. The aqueous solution rapidly decomposes with separation of products insoluble in water. The product corresponds to the formula:

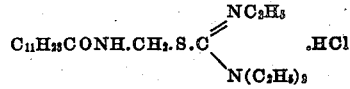

(9) 44 parts of adipic acid di-(n-dodecylamide) are heated with 4 parts of para-formaldehyde and 12 parts of thiourea hydrochloride in alcohol to boiling until a test portion of the mixture dissolves in water. The solvent is then distilled. A salve-like product is obtained which is relatively easily soluble in water and alcohol. The product corresponds to the formula:

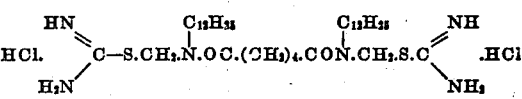

(10) 23 parts of N-n-dodecylacetamide are heated at 65° C. to 70° C., with 4 parts of paraformaldehyde, 10 parts of thiourea and about 4 parts of hydrochloric acid in 100 parts of glacial acetic acid. When a test portion dissolves in water, the product obtained is filtered with suction. It is relatively easily soluble in methanol or water. The product corresponds to the formula:

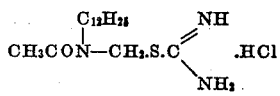

(11) 50 parts of the N-n-dodecylcarbamic acid ester of the hydroxystearic acid amide prepared by the condensation of hydrogenated ricinoleic acid amide with lauryl isocyanate are heated for some time at 70° C. together with 8 parts of para-formaldehyde, 24 parts of thiourea and 8 parts of hydrochloric acid in 100 parts of glacial acetic acid, until a test portion dissolves in water. The solvent is distilled under reduced pressure. There is obtained a product of a wax-like consistency which foams strongly when dissolved in water. The product most probably corresponds to the following formula:

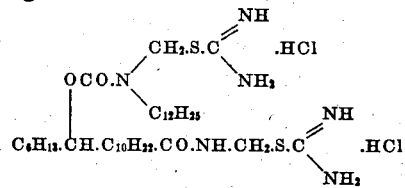

(12) 34 parts of dichlorostearic acid amide are heated for some time together with 4 parts of para-formaldehyde, 12 parts of thiourea, and 4 parts of hydrochloric acid in methanol at boiling temperature until a test portion dissolves in water. The solvent is then distilled under reduced pressure. A resinous product is obtained which forms a turbid solution in alcohol or water. The product corresponds to the following formula:

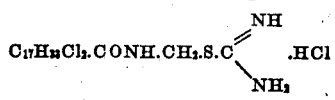

The present application is a continuation-in-part of our copending application Serial No. 243,796, filed Dec. 3, 1938, now U. S. Patent 2,302,585 issued Nov. 24, 1942.

We claim:

1. The process for the production of a thiuronium salt which comprises reacting stearic acid methylol amide with thiourea hydrochloride in the presence of methanol.

2. The process of preparing a thiuronium salt which comprises reacting carbamic acid octadecyl ester with formaldehyde and thiourea hydrochloride in presence of glacial acetic acid.

3. The process of manufacturing thiuronium salts which comprises reacting in the presence of a liquid medium a member of the group consisting of thiourea, N-aliphatic thiourea, N-aryl thiourea, and N-araliphatic thiourea, and a hydrohalic acid and formaldehyde, with a compound selected from the group consisting of carboxylic acid amides and urethanes and containing at least one organic radical of at least 11 carbon atoms.

4. A modification of the process of claim 3 which comprises reacting a hydrohalic salt of a member of the group consisting of thiourea, N-aliphatic thiourea, N-aryl thiourea, and N-araliphatic thiourea, with a condensation product of formaldehyde and a compound selected from the group consisting of carboxylic acid amides and urethanes and containing at least one organic radical of at least 11 carbon atoms.

LUDWIG ORTHNER.
GERHARD BALLE.
GEORG DITTUS.
HERMANN WAGNER.